Oct. 21, 1941.                C. L. HALLADAY                2,259,464
                    ADAPTER PLATE AND BUMPER STRUCTURE
                          Filed March 4, 1940
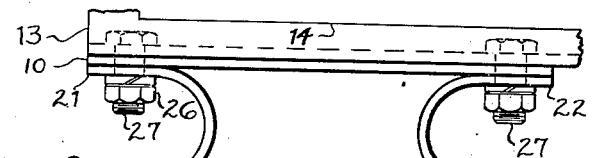
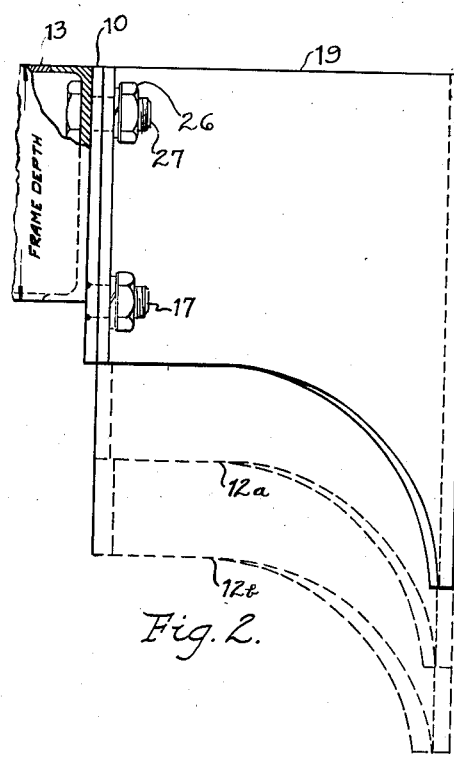
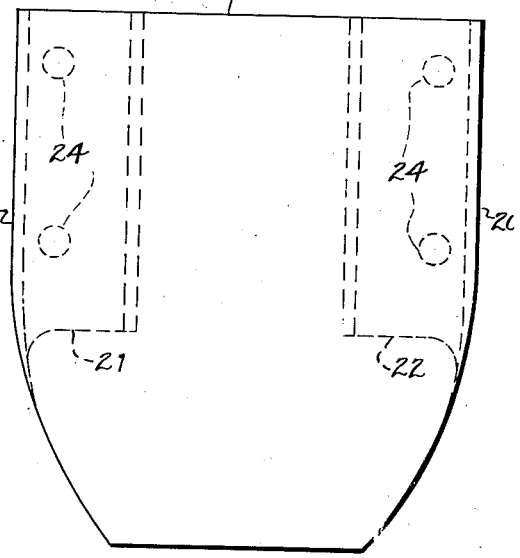
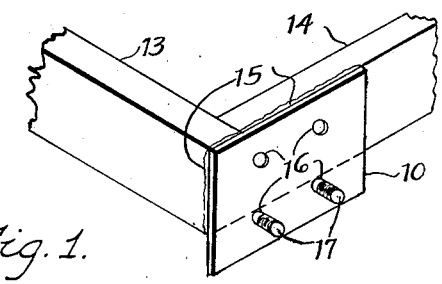
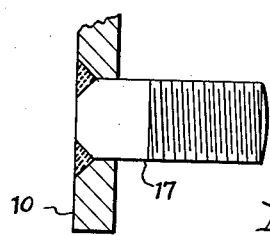
INVENTOR
CALVIN L. HALLADAY
BY
*John F. Stark*
ATTORNEY Patented Oct. 21, 1941

2,259,464

UNITED STATES PATENT OFFICE 2,259,464

ADAPTER PLATE AND BUMPER STRUCTURE

Calvin L. Halladay, Jackson, Mich., assignor, by mesne assignments, to Houdaille-Hershey Corporation, Cleveland, Ohio, a corporation of Michigan Application March 4, 1940, Serial No. 322,054

7 Claims. (Cl. 293—55)

This invention relates to bumper constructions in general and more particularly relates to an adapter plate and bumperette structure for minimizing bumper hardware on commercial vehicles and ordnance trucks.

It is a well known fact that commercial vehicles, and particularly ordnance trucks as supplied by various manufacturers of such vehicles require correspondingly associated frame depths and bumperette thicknesses to carry such loads and absorb commensurable shocks, and likewise necessitates an owner of a fleet of different makes of trucks maintaining, or securing from several sources, bumperette hardware designed to fit the individual requirements of that vehicle. Accordingly, the primary object of this invention is to standardize and reduce to a minimum number of sizes the adapter plates necessary to mount bumperette structures on these classes of vehicles.

Other objects of the invention include the provision of an adapter plate of a uniform shape, having a standard layout of bumperette attaching holes both in spacing and size, but divided into groups relative to the thickness and cross dimensions of the said plate for attachment to vehicle frames coming within a like grouping whereby a bumperette structure of the same classification may be secured thereto; the provision of adapter plates as above described and grouped, containing a standard layout of bumperette holes both in spacing and size, which may be welded to a vehicle frame of insufficient depth to provide through holes between the frame and plates, comprising a pair of countersunk openings and threaded studs projecting outward through the plate body only and welded integrally thereto for use as the lower attaching means to the standard bumperette layout; the provision of an apertured adapter plate as above described, for supporting a bumperette structure having a standardized layout of attaching means, which may be welded to a truck frame of insufficient depth, wherein the apertured plate welded flush to said frame serves as a drill jig for a pair of bumperette stud openings to be made in the frame and said welded studs in the adapter plate serve as the remaining attaching means for the bumperette.

An additional object of this invention is the provision of a bumperette structure of the type disclosed which has impact resisting characteristics commensurable with the weight of vehicle with which it is to be associated, and that has a vehicle frame depth permitting direct attachment of the bumperette thereto; the provision of a bumperette structure for direct attachment to the vehicle frame ends as above described, comprising an elongated impact face substantially greater in longitudinal dimension than the vehicle frame depth including integral back bars or support arms tapering from the relatively deep impact face of the bumperette to the relatively narrow frame depth of the vehicle.

Further and other objects of the invention reside in the novel combination and arrangement of parts to be hereinafter described in conjunction with the drawing forming a part of this specification and particularly pointed out in the appended claims.

In the drawing like reference characters denote corresponding parts in the several views and those with subscripts designate similar parts, and in which:

Fig. 1 is a perspective view of a rear corner of a vehicle frame illustrating one form of an adapter plate of the present invention secured thereto for reception of a bumperette; and Fig. 2 is a side elevational view of the adapter plate with one form of bumperette structure attached thereto, including two additional sizes of bumperettes shown superimposed thereon in broken line form; and Fig. 3 is a plan view of the adapter plate and a bumperette attached thereto; and Fig. 4 is a front elevational view of a bumperette structure showing the standardized mounting.

Fig. 5 is a sectional elevational view through a portion of the adapter plate illustrating a detail of the welded stud countersunk therein.

It will be well to mention at this time that the applicant has made a study of the extensive number of bumper fittings, plates, arms, etc. that the bumper manufacturer must necessarily carry to meet the original equipment needs of various truck manufacturers, or fleet owners having a variety of different make trucks and desiring service parts for the bumpers thereof. As a result of this investigation the applicant has determined that the majority of commercial vehicles and ordnance trucks may be divided into groups or classes, which are classified according to the gross loaded weight of the vehicle. This gross loaded weight classification of the vehicles was used because obviously the weight of the vehicle designates approximately its frame depth and likewise governs the thickness of the metal fittings and component parts of the bumper structure necessary to absorb loads and impact shocks of like weights. From this classification the several makes of commercial trucks, and ordnance vehicles, were grouped accordingly, and a proper thickness of metal section required in the adapter plate and/or bumperette was assigned thereto. This matter of standardizing bumper or bumperette mountings to an adapter plate which is designed for attachment to meet a classification of vehicles of a certain weight group, commensurable with the thickness of the bumper and/or adapter plate section, irrespective of the particular frame depth of the various makes of vehicles coming within that class, is of considerable importance. For example, fleet owners in rural areas requiring bumper parts, or interstate haulers requiring like service enroute, could much more readily afford to carry, or procure locally, one of the several adapted plates or like bumperette sections required to effect the necessary repair rather than the multitude of parts and fittings required at present to service the various makes of trucks and sizes of the same. Further, it is especially useful for military and ordnance trucks or tractors with articulated trailers and pintle draft rigging for hauling gun carriages and the like, which are usually serviced at an army camp or post remotely located from a large selection of service parts; or when on a field expedition which must be serviced in the event of break down from a portable repair field unit. In this event the saving in time, tools and spare parts required to service the broken unit will be readily apparent. A still further advantage in this connection would be the possibility of readily installing bumperettes to existing vehicles in the field where the necessity of such equipment presents itself or a hazard exists in the service in which the vehicle is now operating.

Now having reference to Figs. 1 through 4, inclusive, there is shown an adapter plate 10 and a standardized bumperette 12 for attaching thereto. In the perspective view Fig. 1, a side frame rail 13 and a cross member or box like end frame section 14 provide the base for the adapter plate 10, which is attached thereto by positioning the adapter plate in the upper corner of the frame in line with top of the frame rail and temporarily positioning the adapter plate by a C clamp and then welding the plate around the marginal edges of its body to the frame rails as shown at 15.

As aforementioned, the adapter plate 10 is selected in size and thickness according to the group classification in which the vehicle is relegated. Once this has been determined the plate is pierced with a plurality of holes 16 substantially on the diagonals of the plate and of equal size. Of course, in practice, these plates will be supplied with the holes 16 already punched out because they are standardized for each class into which the adapter falls, to cooperate with a complementary mounting on the bumperette also assigned to that class. In the two lower holes 16 of the plate 10 are a like number of threaded studs 17 which are countersunk flush with the surface of the inner face of the plate and welded integrally thereto, as in Fig. 5, so as to extend outwardly from the adapter plate when it is in position on the frame rails 13 and 14, as in Fig. 1. In practice these studs 17 may also be welded at the source to the adapter plate. After the plate 10 has been welded to the frame end as shown in Fig. 1, the holes 16 will serve as drill jigs to accurately center the openings to be punched through the underlying frame. This method of operation insures that the two openings each in the frame and bumperette will be positively in line and save any lining up of the holes in the field, as if the frames were supplied with the openings, and also obviates the expensive operation of providing slotted openings instead of round holes.

The form of the bumperette 12 shown is designed so as to have a uniform mounting face with openings complementary to those in the adapter plate 10, and in Figs. 2, 3 and 4 a preferred form is shown. The bumperette 12 has two arms 19 and 20 extending from the outer face thereof which have reverse bends in their longitudinal length adjacent the free ends thereof to form the spaced mounting faces 21 and 22, respectively, which are substantially parallel to the outer flat or crowned impact face of the bumperette. A plurality of apertures 24 of equal size and uniformly spaced, according to the class in which the part is grouped, provide the means by which the bumperette may be attached to the adapter plate. As shown, the arms 19 and 20 have been cut away in an arcuate curve from the deep impact face of the bumperette so that the outer bottom edge of the bumper is substantially spade shaped to reduce resistance to being dragged through earth or the edge of a bank, should the vehicle become mired, as compared to the power required to plow a rectangular bar of the same size through the mud. By providing a generous longitudinal length in the impact face below the mounting means of the bumperette all the necessary area is retained for impact with other vehicle bumpers of slightly different heights. Since the ends of the arms 19, and 20 which form the spaced mounting faces 21 and 22 are free to flex a certain amount, their resiliency will afford a means for compensating for any slight manufacturing inaccuracies between the openings in the adapter plate 10 and the bumperette 12. The thickness of the metal section in the bumperette, is commensurable with the thickness of the adapter plate which depends upon the class of vehicle the plate and bumperette are attached according to weight, and as shown in Fig. 2 by broken lines superimposed thereon, the larger sizes of bumperettes 12a and 12b have greater depth to the impact faces and side arms in proportion to their size. Any fastening means such as a bolt and nut means 26 and 27 are positioned through the upper pair of holes 24 and 16 in the bumperette 12 and adapter plate 10, respectively, while the lower pair of integral studs 17 projecting from the adapter plate are threaded through the lower pair of openings 24 in the bumperette and a nut locked thereon.

The particular material used for the adapter plate is immaterial but for ease in welding a low carbon steel such as S. A. E. #1020 is preferable. The bumperette is preferably a high carbon steel such as S. A. E. #1080 which is heat treated to provide the necessary temper for an impact function.

It will be understood that throughout the specification and claims where the term bumperette is used it may be interchanged with the generic term of bumper, since the specific bumperette is only a diminutive form of bumper.

From the foregoing description it will be apparent there has been disclosed a novel form of adapter plate and bumperette for reducing to a minimum number of sizes the units necessary to equip or service vehicles, regardless of their make, with an associated bumperette, that accomplishes all the objects and advantages of the invention as first mentioned. However, in practice, since the specific form of adapter plate and bumperette may assume various modifications, it is not intended to be limited to the specific disclosures herein but to include all formal changes and modifications within the spirit of this invention as defined by the following claims.

What I claim is:

1. As a new article of manufacture for vehicles, regardless of make but grouped according to weight and average frame depth, an adapter plate permanently secured to the rear corners of the frame in line with the upper edge thereof for mounting a bumper structure, and said plate having a laterally disposed pair of studs of uniform spacing and size projecting outwardly from the rear face thereof without regard to the frame depth, and a pair of laterally disposed apertures in said adapter plate respectively directly above said mentioned studs and spaced thereabove according to said frame depth which serve as a centering means for holes to be pierced through said frame for reception of attachment means for a bumperette.

2. An adapter plate and bumperette structure for attachment to truck chassis which have an average frame depth according to a selected classification that it is relegated dependant on the gross truck weight, said adapters comprising rectangular plate bodies for permanent attachment to each of the corner sections of the frame structure of said chassis and having a standard metal thickness of predetermined amount commensurable with the weight classification of the vehicle chassis to which it is to be secured, a standardized pair of uniformly spaced and sized threaded studs countersunk into said plate and projecting rearwardly therefrom including a pair of like size and spaced apertures longitudinally spaced above said studs, a bumperette structure having a metal thickness commensurable to said adapter plate and including a standardized mounting face for mutual association with said adapter plates of a selected classification, and fastening means including said threaded studs and aligned apertures in said bumperette and adapter plate for detachably mounting the same.

3. An adapter plate and bumperette structure for attachment to truck chassis which have an average frame depth according to a selected classification that it is relegated dependant on the gross truck weight, said adapters comprising rectangular plate bodies for permanent attachment to each of the corner sections of the frame structure of said chassis and having a standard metal thickness of predetermined amount commensurable with the weight classification of the vehicle chassis to which it is to be secured, a standardized pair of uniformly spaced and sized threaded studs countersunk into said plate and projecting rearwardly therefrom including a pair of like size and spaced apertures longitudinally spaced above said studs, a bumperette structure having a metal thickness commensurable to said adapter plate and including a standardized mounting face for mutual association with said adapter plates of a selected classification, and fastening means including said threaded studs and aligned apertures in said bumperette and adapter plate for detachably mounting the same, said bumperette mounting face comprising spaced sections lying in a common longitudinal plane and free to move laterally toward and away from each other to compensate for mechanical inaccuracies between the preformed openings in the adapter plate and bumperette.

4. A bumperette support of the class described for the corner frame ends of vehicle chassis having variable frame depths, comprising a plate member permanently welded or riveted to said frame ends with the upper marginal edge of the plate member and corner frame ends adjacent each other, said plate member having at least two laterally spaced threaded stud members extending outwardly from the body of said plate a predetermined distance above the lower edge thereof irrespective of the lower edge of the frame, and a like number of through openings in said member longitudinally spaced above said stud members a suitable distance for reception of fastening means selected to extend through the plate member and cooperating openings in the frame walls, so as to provide additional support for said plate member and a bumperette to be attached thereto.

5. In combination with a vehicle chassis of scelected classification according to frame depth, a bumperette structure of like classification for attachment thereto at the corner frame ends, said bumperette comprising a substantially spade shaped impact face relatively deeper in longitudinal dimension than said frame depth including side arms extending from said impact face and having an arcuate taper therein from adjacent the full depth of the impact face to substantially the frame depth at their free ends, and said free ends having reverse outward bends forming spaced mounting faces for attachment of the bumperette to the vehicle chassis.

6. A bumperette structure of the class described for direct attachment to the ends of a vehicle frame, comprising an impact face of substantially spade shape and relatively greater in longitudinal dimension than the depth of said frame, side arms integral with opposite edges of said impact face extending in non-parallel directions for supporting said bumperette to the vehicle frame, said side arms having tapered lower marginal edges extending from substantially the full depth of said impact face to the frame depth at their frame supported ends, and said side arms at their frame ends having reverse bends therein forming spaced mounting faces lying in a plane approximately parallel to said impact face.

7. A bumperette structure of the class described for direct attachment to the end of a vehicle frame, said bumperette being of substantially U shape in plan including integral non-parallel frame supported arms having outward bends therein adjacent the free ends of the U providing spaced attaching faces, an impact face on said bumperette of substantially greater depth than said vehicle frame, and said frame supported arms of the U having an undercut portion in their lower marginal edge extending from the lower edge of said impact face to the lower marginal edge of said vehicle frame.

CALVIN L. HALLADAY.